United States Patent [19]

Kikuga et al.

[11] 4,412,045
[45] * Oct. 25, 1983

[54] COLOR DEVELOPER FOR PRESSURE-SENSITIVE COPYING PAPER

[75] Inventors: Toyoji Kikuga; Koji Hirai, both of Fujieda, Japan

[73] Assignee: Sumitomo Durez Company, Ltd., Shizuoka, Japan

[*] Notice: The portion of the term of this patent subsequent to Aug. 5, 1997, has been disclaimed.

[21] Appl. No.: 342,537

[22] Filed: Jan. 25, 1982

Related U.S. Application Data

[60] Continuation of Ser. No. 173,562, Jul. 30, 1980, which is a division of Ser. No. 847,519, Nov. 1, 1977, Pat. No. 4,216,300.

[30] Foreign Application Priority Data

Nov. 4, 1976 [JP] Japan .................................. 51-131672

[51] Int. Cl.³ ...................... C08L 61/06; C08L 61/08; C08L 61/12; C08L 61/34
[52] U.S. Cl. .................................... 525/501; 282/27.5; 525/500; 525/504; 525/505; 525/491
[58] Field of Search ...................... 525/491, 500, 501; 282/27.5

[56] References Cited

U.S. PATENT DOCUMENTS

| | | | |
|---|---|---|---|
| 3,988,386 | 10/1976 | Hesse et al. | 525/481 |
| 4,216,300 | 8/1980 | Kikuga et al. | 525/491 |

FOREIGN PATENT DOCUMENTS

| | | | |
|---|---|---|---|
| 42-20144 | 10/1967 | Japan | 525/480 |
| 46-37451 | 11/1971 | Japan | 525/480 |
| 47-20971 | 6/1972 | Japan | 525/480 |
| 48-57744 | 7/1973 | Japan | 525/480 |

*Primary Examiner*—Howard E. Schain
*Attorney, Agent, or Firm*—James F. Tao; James F. Mudd

[57] ABSTRACT

A color developer for pressure-sensitive copying papers is prepared by mixing a para-substituted difunctional phenol-aldehyde condensate and tri- or higher-functional phenol-aldehyde condensate. The tri- or higher-functional phenol-aldehyde condensate can be modified by a polyvalent metal.

42 Claims, No Drawings

COLOR DEVELOPER FOR PRESSURE-SENSITIVE COPYING PAPER

This is a continuation of application Ser. No. 173,562, filed July 30, 1980 which in turn is a division of U.S. application Ser. No. 847,519, filed Nov. 1, 1977, now U.S. Pat. No. 4,216,300.

The present invention relates to a color developer for use in a pressure-sensitive copying paper, and more particularly to an improvement in phenol-aldehyde condensate employed in such color developer.

The pressure-sensitive copying paper, or so-called carbonless copying paper, is generally based on a reaction between a colorless electron-donating organic compound (hereinafter referred to as color former) and an electron-accepting color-developing material (hereinafter referred to as color developer) capable of generating a colored product upon reaction with said color former.

The known examples of said color developer are inorganic clay materials, such as Japanese acid clay, active white clay, attapulgite, zeolite, bentonita, Kaolin etc. and phenol-formaldehyde condensates such as p-substituted difunctional phenol-formaldehyde condensates. The phenol-aldehyde condensates, being superior to said inorganic clays in their ability to form a moisture-resistant colored image (developed image as well as color developing ability being not affected by the moisture in the air) upon reaction with color formers, have been commercially utilized as the color developer and have been subjected to various improvements.

In the Japanese Patent Publication Sho 42-20144 and Sho 46-37451 there is demonstrated the use of p-substituted difunctional phenol-aldehyde condensates as a color developer. However, the color developer disclosed in these patent publications; though being capable of generating satisfactorily moisture-resistant image, are still associated with certain drawbacks such as (1) a still insufficient color developing ability, (2) an insufficient weathering property (tendency of yellowing of copying paper under direct sunlight or in indoor standing). (3) a poor oil-resistance (loss of color developing ability or fading of once developed image when the color developing sheet is smeared with gasoline, a plasticizer such as phthalic esters, or ethyl alcohol), and the like.

Further, in Japanese Patent Publication Sho 47-20971 there is disclosed the addition of a divalent metal salt such as zinc chloride to p-substituted difunctional phenol-formaldehyde condensates at the preparation of coating formulation. Also in the Japanese Patent Laid-Open 48-25744 there is disclosed a zinc salt of p-substituted difunctional phenol-formaldehyde condensate, or, substantially a zinc salt of p-phenyl-phenol-formaldehyde condensate. However, such color developers are still unable to meet all the requirements of color developing ability, weathering property and oil-resistance, and there still exists a strong demand for the improvement of color developer in order to improve the performance of pressure-sensitive copying paper.

In accordance with this invention it has been discovered that the aforementioned drawbacks can be significantly alleviated by the use of a color developer containing a p-substituted difunctional phenol-aldehyde condensate and a tri- or higher-functional penol-aldehyde condensate or of a color developer containing a p-substituted difunctional phenol-aldehyde condensate a tri- or higher-functional phenol-formaldehyde condensate modified by a polyvalent metal. The aforementioned para-substituted difunctional phenol is, for example, a para-substituted difunctional phenol wherein the para-substituent is a hydrocarbon group of 1 to 12 carbon atoms, e.g. an alkyl or aryl group.

More specifically it has been found that, through the tri- or higher functional phenol-aldehyde condensates themselves are provided with almost no color developing ability, the addition of such condensates or modified products thereof with a polyvalent metal to conventional p-substituted difunctional phenol-aldehyde condensates at the reaction or crushing thereof or at the preparation thereof into a coating solution makes it possible to obtain a color developer which has a color developing ability and an oil-resistance significantly superior to those obtained in the sole use of p-substituted difunctional phenol-aldehyde condensates, and of which weathering property and oil-resistance are considerably improved in comparison with the commercially employed p-phenylphenol-formaldehyde condensate.

Although the performance of phenol-aldehyde condensates has been interpreted in terms of the color developing ability and the compatibility with the oil present in the microcapsules to maintain the color formers in dissolved state, the present invention is characterized by intentionally adding tri- or higher-functional phenol-aldehyde condensates which are of relatively low compatibility. The color developing mechanism between the color former and color developer in the pressure-sensitive copying paper has never been fully clarified. In view of the fact that conventional phenol-aldehyde condensates have been used in combination with Japanese acid clay or active white clay which are not compatible with oil, it is believed that the improvement in the color developing ability is achieved by a particular effect of the addition of tri- or higher-functional phenol-aldehyde condensates.

Further, it is important to note that co-condensates of a p-substituted difunctional phenol and tri- or higher-functional phenol which can be anticipated to be equally effective are in fact unable to exhibit the effects at of the present invention. Besides in such co-condensation a higher percentage of tri- or higher-functional phenol generally renders the synthesis more difficult, leads to frequency troubles at the reaction such as foaming, also renders the emulsification necessary for coating more difficult and eventually results in an unstable dispersion which is not adequate for practical purposes.

The examples of p-substituted difunctional phenol-aldehyde condensates adapted for use in the present invention are the condensates with aldehydes of at least one member selected from p-cresol, p-ethyl phenol, p-propylphenol, p-sec-butylphenol, p-tert-butylphenol (the foregong p-sec.-and p-tert.-butyl phenols are illustrative of phenols substituted with branched chain p-alkyl substituents), p-amylphenol, p-cyclohexylphenol, p-heptylphenol, p-tert-octylphenol, p-dodecylphenol, p-nonylphenol, p-chlorophenol, p-bromophenol, p-phenylphenol, p-cumylphenol, p-phenol sulfonic acid, p-hydroxy benzoic acid and p-hydroxy benzoic esters.

In such condensates there are also included limited co-condensates containing above mentioned p-substituted difunctional phenols and tri- or higher-functional phenols wherein the amount of the latter is limited to about 0.6 moles or less with respect to 1 mole of the former. In consideration of the tone of color and performance of the obtained resin as well as the easiness of synthesis thereof, the preferred examples of such condensates are p-tert-butylphenol-formaldehyde condensate, p-tert-octylphenol-formaldehyde condensate, p-phenylphenol-formaldehyde condensate, co-condensates of p-tert-butylphenol, g-tert-octylphenol or p-phenylphenol with phenol, bisphenol-A(4,4'-dihydroxydiphenylpropane) or bisphenolsulfone (4,4'dihydroxydiphenylsulfone) with formaldehyde, among which particularly preferred are p-tert-butylphenol-formaldehyde condensate, p-tert-octylphenol-formaldehyde condensate and p-phenylphenol-formaldehyde condensate. Furthermore, such condensates may contain more than two species of p-substituted difunctional phenols selected arbitrarily.

The p-substituted difunctionl phenols employed in the present invention mean p-substituted phenols containing, in each molecule thereof, two function carbons capable of reacting with aldehydes.

Also with tri- or higher-functional phenol-aldehyde condensates to be employed in the present invention are condensates with an aldehyde of at least one member selected from phenol, metacresol, 1,3,5-xylenol, bisphenol-A, bisphenolsulfone, resorcinol, alpha-naphthol, beta-naphthol, catechol, and the like. In such condensates there are also included limited co-condensates of above mentioned tri- or higher-functional phenols and p-substituted difunctional phenols wherein the amount of the latter is limited to 0.1 moles or less with respect to 1 mole of the former. The preferred examples of such condensates are phenol-formaldehyde condensate, bisphenol-A-formaldehyde condensate, bisphenolsulfone-formaldehyde condensate and the co-condensates thereof. The tri- or higher-functional phenols employed in the present invention mean phenols containing, in each molecule thereof, three or more functional carbons capable of reacting with an aldehye.

The examples of aldehydes to be employed in the present invention are formaldehyde (formalin, paraformaldehyde), acetaldehyde, butyraldehyde etc. particularly formaldehyde. Generally the aldehydes contain one to 8 carbon atoms.

The examples of acidic catalyst to be employed in the condensation reaction of the present invention are ordinary inorganic or organic acids such as hydrochloric acid, sulfuric acid, phosphoric acid, oxalic acid, acetic acid, formic acid, p-toluenesulfonic acid, benzenesulfonic acid, phenolsulfonic acid etc., and, in consideration of the color of the obtained condensate particularly preferred are hydrochloric acid and oxalic acid. In case the condensation reaction is initially conducted in the presence of an alkaline catalyst and then continued in an acidic condition after neutralization, there can be employed a basic catalyst such as sodium hydroxide, potassium hydroxide, calcium hydroxide, barium hydroxide etc.

The examples of metal salt to be employed in the present invention for modifying the tri- or higher-functional phenol-aldehyde condensates are chloride, nitrate, sulfate, formate, acetate, benzoate, hydroxybenzoate, salicylate, borate, phosphate, etc., of a polyvalent metal such as zinc, magnesium, tin, cadmium, lead, titanium, calcium, cobalt, iron, nickel, copper or manganese. In consideration of the color of the resulting product particularly preferred are salts of zinc, aluminum, calcium, or magnesium.

In the following there will be given an explanation on the process for producing the color developer of the present invention:

(1) Preparation of p-substituted difunctional phenol-aldehyde condensates.

(a) At least one p-substituted difunctional phenol and an aldehyde are subjected to condensation reaction in the presence of an acidic catalyst and with or without the addition or an organic solvent such as benzene, toluene, zylene, trichloroethylene, and the reaction product is subjected to the elimination of water and solvent to obtain the condensate to be employed in the present invention.

(b) At least one p-substituted difunctional phenol and an aldehyde are firstly subjected to a resol reaction with an alkaline catalyst. Then the reaction product is acidified to a pH of 4–6 with sulfuric acid, phosphoric acid or hydrochloric acid and, eventually after washing with water to eliminate the salt resulting from neutralization, is subjected to novolac condensation reaction in the presence or absence of an acid catalyst followed by the elimination of water and solvent to obtain the condensate to be employed in the present invention.

(c) The condensates employable in the present invention also include co-condensates wherein p-substituted difunctional phenols, tri- or higher-functional phenols and an aldehyde are co-condensed in a limited proportion. In the preparation of the condensates for use in the present invention, the aldehyde is preferably used in an amount of 0.5–0.9 moles with respect to 1 mole of p-substituted difunctional phenols (inclusive of tri- or higher-functional phenols in case of co-condensates).

(2) Preparation of tri- or higher-functional phenol-aldehyde condensates.

(a) At least one tri- or higher-functional phenol and an aldehyde are subjected to condensation reaction in the presence of an acid catalyst and then to dehydration to obtain the condensate for use in the present invention.

(b) At least one tri- or higher-functional phenol and an aldehyde are subjected to a resol reaction in the presence of a basic catlyst, then the reaction product is acidified to a pH of 4–6 and, eventually after washing with water to eliminate the salt resulting from neutralization, to novolac condensation reaction in the presence or absence of an acidic catalyst followed by dehydration to obtain the condensate for use in the present invention.

(c) The condensates employable in the present invention also include co-condensates wherein tri- or higher-functional phenols, p-substituted difunctional phenols and an aldehyde are co-condensed in a limited proportion. In the preparation of the condensates for use in the present invention, the aldehyde is preferably used in an amount of 0.4–0.8 moles with respect to 1 mole of tri- or higher-functional phenols (inclusive of p-substituted difunctional phenols in case of co-condensates).

(3) Preparation of tri- or higher-functional phenol-aldehyde condensates modified by polyvalent metal:

A tri- or higher-functional phenol-aldehyde condensate prepared according to the above method (2) (a), (b), or (c) is reacted with a suitable amount of an alkaline material such as ammonium carbonate or sodium hydroxide and a polyvalent metal salt such as zinc dibenzoate or zinc acetate at a temperature of 150°–200° C. to obtain the modified condensate adapted for use in the present invention. Otherwise such tri- or higher-functional phenol-aldehyde condensate prepared according to the above method (2) (a), (b), or (c) is dispersed or dissolved in an alkaline material such as sodium hydroxide, and the resulting solution is gradually added with a suitable amount of a polyvalent metal salt such as zinc chloride or aluminum sulfate to obtain the modified condensate for use in the present invention. The metal-modified condensates employed in the present invention preferably contain metals in an amount of 1–10 wt.%.

(4) Preparation of color developer according to the present invention:

The color developer of the present invention is characterized by containing at least one member of said p-substituted difunctional phenol-aldehyde condensates and at least one member of said tri- or higher-functional phenol-aldehyde condensates or polyvalent metal-modified products thereof, and can be prepared either by adding said tri- or higher-functional phenol-aldehyde condensates or polyvalent metal-modified products thereof in molten state during or after the condensation reaction of p-substituted difunctional phenols and aldehyde, or by adding said p-substituted difunctonal phenol-aldehyde condensates in molten state during or after the condensation reaction of tri- or higher-functional phenols and aldehyde. The color developer of the present invention can further be prepared either by mixing said p-substituted difunctional phenol-aldehyde condensates and said tri- or higher-functional phenol-aldehyde condensates at the crushing step thereof, or by preparing a dispersion with suitable surfactants or dispersants or a solution with suitable solvents of said p-substituted difunctional phenol-aldehyde condensates and adding thereto a similar dispersion or solution of said tri- or higher-functional phenol-aldehyde condensates.

The present invention further includes a process wherein the coating solution for the pressure-sensitive copying paper is prepared by separately adding thereto said p-substituted difunctional phenol-aldehyde condensates and said tri- and higher-functional phenol-aldehyde condensates. The ratio of said p-substituted difunctional phenol-aldehyde condensates to said tri- or higher-functional phenol-aldehyde condensates or to their polyvalent metal-modified products is preferably within a range from 1:0.1 to 1:2, more particularly within a range from 1:0.5 to 1:1.5.

The improved color developer of the present invention thus obtained is characterized, in comparison with the conventional color developers, with the following advantages:

(1) a higher color developing ability (more vivid in color and higher color developing speed):
(2) an improved weathering property and an improved oil resistance:
(3) an improved dispersion in the coating and an improved stability of obtained dispersion: and
(4) a facilitated preparation and a stabilized quality of products.

It is believed that the improvement in the color developing ability is achieved by a particular effect of the tri- or higher-functional phenol-aldehyde condensates. Also said tri- or higher-functional phenol-aldehyde condensates, which themselves are oil resistant, are apparently effective for improving the oil resistance of the color developer of the present invention.

For example, the color developer of the present invention enables to completely avoid the troubles which have been frequently encountered when a pressure-sensitive copying paper comes into contact with a plastic film containing a plasticizer or with gasoline or the like.

The color developer of the present invention, due to the improved color developing ability thereof, enables the user to obtain a color intensity with a reduced coating amount, thus giving rise to a substantial cost reduction in the pressure-sensitive copying paper. The above mentioned effect becomes even more evident when the color developer of the present invention is used in combination with an inorganic color developer such as Japanese acid clay, active white clay or Kaolin. Also the use of inorganic fillers in combinations therewith is possible.

Now the advantages of the color developer of the present invention will be explained in detal by the following non-limitative examples. Throughout this specification and claims, the parts and percentages signify parts by weight and percentages by weight unless specified otherwise.

EXAMPLE A 500 parts of p-phenylphenol, 124 parts of 37% formalin, 100 parts of benzene and 5 parts of oxalic acid were placed in a reactor and reacted for 10 hours under reflux. After the elimination of water and solvent, the reaction mixture was heated to 180° C. and taken out from the reactor to obtain a condensate (A) of yellowish brown color with a melting point of 80° C.

EXAMPLE B 350 parts of p-tert-butylphenol, 150 parts of p-tert-octylphenol, 199 parts of 37% formalin and 2 parts of concentrated (35.5%) hydrochloric acid were placed in a reactor and reacted for 5 hours under reflux. After the elimination of water, the reaction mixture was heated to 180° C. and taken out from the reactor to obtain a yellow condensate (B) with a melting point of 85° C.

EXAMPLE C 500 parts of p-tert-octylphenol, 158 parts of 37% formalin, 25 parts of 20% aqueous solution of sodium hydroxide and 300 parts of water were placed in a reactor and reacted for 2 hours under reflux. The reaction mixture was acidified with concentrated sulfuric acid to pH4–6, then further adding 2 parts of concentrated hydrochloric acid, reacted for 1 hour under reflux. After elimination of water, the mixture was heated to 170° C. to obtain a condensate (C) of a melting point of 90° C.

EXAMPLE D 450 parts of p-phenylphenol, 50 parts of phenol, 154 parts of 37% formalin, 5 parts of oxalic acid and 150 parts of xylene were placed in a reactor and reacted for 3 hours under reflux. After the elimination of water and solvent, the reaction mixture was heated to obtain a condensate (D) of a melting point of 81° C.

EXAMPLE E 450 parts of p-tert-octylphenol, 50 parts of phenol, 185 parts of 37% formalin, 2 parts of concentrated hydrochloric acid and 100 parts of benzene were placed in a reactor and reacted for 10 hours under reflux. After the elimination of water and solvent, the reaction mixture was heated to 170° C. to obtain a condensate (E) of a melting point of 89° C.

EXAMPLE F 500 parts of phenol, 341 points of 37% formalin and 1 part of concentrated hydrochloric acid were placed in a reactor and reacted for 3 hours under reflux. After the elimination of water, the reaction mixture was heated to 180° C. to obtain a condensate (F) of a melting point of 82° C.

EXAMPLE G 500 parts of bisphenol-A, 124 parts of 37% formalin, 1 part of concentrated hydrochloric acid and 150 parts of xylene were placed in a reactor and reacted for 3 hours under reflux. After elimination of water and solvent, the reaction mixture was heated to 130° C. to obtain a condensate (G) of a melting point of 85° C.

EXAMPLE H 500 parts of bisphenolsulfone (product of Nikka Kagaku Kogyo Co.), 124 parts of 37% formalin, 50 parts of a 20% aqueous solution of sodium hydroxide and 200 parts of water were placed in a reactor and reacted for 4 hours under reflux, and the mixture was acidified to pH4–6 with concentrated sulfuric acid.

To the mixture was then added 1 part of concentrated hydrochloric acid, then reacted for 1 hour under reflux, and, after the elimination of water, heated to 150° C. to obtain a condensate (H) of a melting point of 90° C.

EXAMPLE I 475 parts of bisphenol-A, 25 parts of p-tert-octylphenol, 107 parts of 37% formalin, 2 parts of concentrated hydrochloric acid and 250 parts of xylene were placed in a reactor and reacted for 6 hours under reflux. After the elimination of water and solvent, the mixture was further heated to 130° C. to obtain a condensate (I) of a melting point of 83° C.

EXAMPLE J 500 parts of the condensate (F) obtained in the synthesis Example F were heated to 170° C. in a reactor, and to this were added gradually 73 parts of ammonium bicarbonate and 88 parts of zinc acetate to obtain a zinc-modified condensate (J) of a melting point of 83° C.

The following Tab. I summarizes the composition and copying performance of the color developer of the present invention (Examples 1 3) containing p-substituted difunctional phenol-aldehyde condensates and tri- or higher-functional phenol-aldehyde condensates, also making comparison with the Reference Example 1 to 6.

TABLE I

| | Color Developer Composition | | | | Performance[1] | | | |
|---|---|---|---|---|---|---|---|---|
| | p-Substituted Difunctional Phenol-Aldehyde Condensate | parts | Tri- or Higher Functional Phenol-Aldehyde Condensate | parts | Color Developing Ability | Weathering Property | Oil Resistance | Stability of Dispersion |
| Example 1 | Condensate A | 100 | Condensate G | 50 | 55 | 91 | ** | *** |
| 2 | Condensate A | 100 | Condensate G | 100 | 57 | 93 | *** | *** |
| 3 | Condensate A | 100 | Condensate G | 150 | 59 | 95 | *** | *** |
| Reference Example 1 | Condensate A | 100 | — | — | 61 | 85 | * | *** |
| 2 | — | — | Condensate G | 100 | 85 | 95 | *** | * |
| Example 4 | Condensate B | 100 | Condensate F | 50 | 65 | 86 | *** | *** |
| 5 | Condensate B | 100 | Condensate J | 100 | 64 | 87 | *** | *** |
| Reference Example 3 | Condensate B | 100 | — | — | 75 | 90 | * | *** |
| 4 | — | — | Condensate F | 100 | 96 | 60 | — | * |
| 5 | — | — | Condensate J | 100 | 96 | 70 | — | * |
| Example 6 | Condensate C | 100 | Condensate F | 50 | 68 | 85 | *** | *** |
| Reference Example 6 | Condensate C | 100 | — | — | 85 | 93 | * | *** |
| Example 7 | Condensate D | 100 | Condensate H | 50 | 52 | 88 | *** | *** |
| 8 | Condensate E | 100 | Condensate I | 100 | 67 | 88 | *** | *** |

[1]Explained in end of specification

From the foregoing table it will be understood that a satisfactory balance between the color developing ability, weathering property, oil resistance and dispersibility is achieved in every Example. More specifically, in comparison with the Reference Example 1 which is p-phenylphenol formaldehyde condensate presently employed in commercial purpose, the Examples 1, 2 and 3 are superior in all properties, respectively.

Also in comparison with the Reference Example 3 representing a formaldehyde condensate of p-tert-butylphenol and p-tert-octylphenol which is provided with a satisfactory weathering property but is deficient in the color developing ability and oil resistance, the color developers of Examples 4 and 5 are provided with improved color developing ability and oil resistance without affecting the weathering property.

Test Methods

1. Preparation of coating composition and of color developing sheet

A mixture consisting of 40 parts of the color developer obtained according to either all of the Examples or all of Reference Examples, 2 parts of an anionic surfactant and 58 parts of water was subjected to wet crushing in the Attriter to obtain an emulsion in which the color developer is dispersed to a particle size not exceeding 5 microns. The emulsion thus obtained was mixed with the following components to obtain a coating composition. Thus obtained composition was coated with a coating rod on a paper sheet with a dried weight of 5 g/m², and the coated paper was dried by standing for one day at room temperature to obtain a color developing sheet which was used for various tests.

| Preparation of Coating Composition | |
|---|---|
| Component | Quantity (part) |
| Emulsion of color developer | 6.3 |
| Xaolin clay | 20.4 |
| Silica gel | 0.9 |
| Calcium carbonate | 2.8 |
| Styrene-butadiene latex | 4.1 |
| Starch binder | 2.8 |
| Water | 62.7 |

Test Methods for Performance (a) Color developing ability: A paper sheet coated with microcapsules containing crystal violet lactone was superposed on the above mentioned color developing sheet, and color was generated by applying a pressure of 500 kg/cm² thereon. The generated color was measured one hour later with a reflectance densitometer (Nihon Denshoku Co.) and represented by the reflectance (%), which, the lower the value is, the higher is the generated color intensity.

(b) Weathering property: The above mentioned color developing sheet was exposed to sunlight for 10 hours, and the reflectance was measured before and after the exposure. The weathering property was calculated by the following equation:

$$\text{weathering property} = \frac{\text{reflectance after exposure}}{\text{reflectance before exposure}} \times 100$$

Thus the higher is the calculated figure, the better is the resistance against weathering.

(c) Oil resistance: A color developing sheet on which color is generated 24 hours was immersed, 24 hours after the color generation, in gasoline for 1 second, and the change in the color was evaluated as follows:
* \*\*\* no change in color
* \*\* color faded partly
* \* color faded completely (d) Stability of dispersion: A mixture of 40 parts of color developer, 2 parts of an anionic surfactant and 58 parts of water was subjected to wet crushing in the Attriter to obtain an emulsion of which stability of dispersion was evaluated as follows:
* \*\*\* satisfactory stable (for one month)
* \* stability insufficient

We claim:

1. A color developer for pressure-sensitive copying paper which comprises a mixture of:
   (1) a para-substituted difunctional phenol-aldehyde condensate, and
   (2) a tri- or higher functional phenol-aldehyde condensate.
2. A color developer according to claim 1 wherein the aldehyde is formaldehyde.
3. A color developer according to claim 2 wherein the para-substituent of said para-substituted difunctional phenol is a hydrocarbon substituent of 1 to 12 carbon atoms.
4. A color developer according to claim 3 wherein said hydrocarbon substituent is an aryl substituent.
5. A color developer according to claim 4 wherein said aryl substituent is the phenyl group.
6. A color developer according to claim 3 wherein said hydrocarbon substituent is an alkyl substituent.
7. A color developer according to claim 6 wherein said akyl substituent is a branched chain alkyl substituent.
8. A color developer according to claim 7 wherein said branched chain alkyl substituent is the tertiary butyl group.
9. A color developer according to claim 7 wherein said branched chain alkyl substituent is the tertiary octyl group.
10. A color developer according to claim 1 wherein the weight ratio of said para-substituted difunctional phenol-aldehyde condensate (1) to said tri- or higher functional phenol-aldehyde condensate (2) is within a range of from about 1:0.1 to 1:2.
11. A color developer according to claim 10 wherein the tri- or higher functional phenol is phenol.
12. A color developer according to claim 10 wherein the tri- or higher functional phenol is bisphenol A.
13. A color developer according to claim 10 wherein the tri- or higher functional phenol is bisphenol sulfone.
14. A color developer according to claim 1 wherein the tri- or higher functional phenol-aldehyde condensate (2) is modified by a polyvalent metal.
15. A color developr according to claim 1 wherein the para-substituted difunctional phenol-aldehyde condensate (1) is a condensate obtained by co-codensation with the aldehyde of at least one para-substituted difunctional phenol and a tri- or higher functional phenol in an amount of about 0.6 mole or less per mole of the para-substituted difunctional phenol.
16. A color developer according to claim 15 wherein the para-substituent of said para-substituted difunctional phenol is a hydrocarbon substituent of 1 to 12 carbon atoms.
17. A color developer according to claim 16 wherein said hydrocarbon substituent is an alkyl substituent.
18. A color developer according to claim 17 wherein said alkyl substituent is a branched chain alkyl substituent.
19. A color developer according to claim 18 wherein said branched chain alkyl substituent is the tertiary butyl group.
20. A color developer according to claim 18 wherein said branched chain alkyl substituent is the tertiary octyl group.
21. A color developer according to claim 16 wherein said hydrocarbon substituent is an aryl substituent and the aldehyde is formaldehyde.
22. A color developer according to claim 21 wherein said aryl substituent is the phenyl group.
23. A color developer according to claim 15 wherein the weight ratio of said para-substituted difunctional phenol-aldehyde condensate (1) to said tri- or higher functional phenol-aldehyde condensate (2) is within a range of from about 1:0.1 to 1:2.
24. A color developer according to claim 23 wherein the aldehyde is formaldehyde.
25. A color developer according to claim 23 wherein said tri- or higher functional phenol is phenol.
26. A color developer according to claim 23 wherein the tri- or higher functional phenol is bisphenol A.
27. A color developer according to claim 23 wherein the tri- or higher functional phenol is bisphenol sulfone.

28. A color developer according to claim 15 wherein the tri- or higher functional phenol-aldehyde condensate (2) is modified by a polyvalent metal.

29. A color developer according to claim 1 wherein said tri- or higher functional phenol-aldehyde condensate (2) is a condensate obtained by co-condensation with the aldehyde of a tri- or higher functional phenol in an amount of 1 mole and a para-substituted difunctional phenol in an amount of about 0.1 or less.

30. A color developer according to claim 29 wherein the aldehyde is formaldehyde.

31. A color developer according to claim 30 wherein the para-substituent of said para-substituted difunctional phenol of condensate (2) is a hydrocarbon substituent of 1 to 12 carbon atoms.

32. A color developer according to claim 31 wherein said hydrocarbon substituent is an aryl substituent.

33. A color developer according to claim 32 wherein said aryl substituent is the phenyl group.

34. A color developer according to claim 31 wherein said hydrocarbon substituent is an alkyl substituent.

35. A color developer according to claim 33 wherein said alkyl substituent is a branched chain alkyl substituent.

36. A color developer according to claim 35 wherein the branched chain alkyl substituent is the tertiary alkyl group.

37. A color developer according to claim 34 wherein the branched chain alkyl substituent is the tertiary octyl group.

38. A color developer according to claim 29 wherein the weight ratio of said para-substituted difunctional phenol-aldehyde condensate (1) to said tri- or higher functional phenol-aldehyde condensate (2) is within a range of from about 1:0.1 to 1:2.

39. A color developer according to claim 38 wherein the tri- or higher functional phenol is phenol.

40. A color developer according to claim 38 wherein the tri- or higher functional phenol is bisphenol A.

41. A color developer according to claim 38 wherein the tri- or higher functional phenol is bisphenol sulfone.

42. A color developer according to claim 29 said tri- or higher functional phenol-aldehyde condensate (2) is modified by a polyvalent metal.

* * * * *